United States Patent
Vergel

(10) Patent No.: US 8,541,636 B2
(45) Date of Patent: Sep. 24, 2013

(54) PROCESS FOR HYDROTREATING A DIESEL FUEL FEEDSTOCK, HYDROTREATING UNIT FOR IMPLEMENTING SAID PROCESS, AND CORRESPONDING HYDROREFINING UNIT

(75) Inventor: César Vergel, Maneglise (FR)

(73) Assignee: Total Raffinage Marketing, Puteaux (FR)

( * ) Notice: Subject to any disclaimer, the term of this patent is extended or adjusted under 35 U.S.C. 154(b) by 1063 days.

(21) Appl. No.: 12/526,601

(22) PCT Filed: Feb. 12, 2008

(86) PCT No.: PCT/FR2008/000176
§ 371 (c)(1),
(2), (4) Date: Aug. 10, 2009

(87) PCT Pub. No.: WO2008/119895
PCT Pub. Date: Oct. 9, 2008

(65) Prior Publication Data
US 2010/0038284 A1    Feb. 18, 2010

(30) Foreign Application Priority Data
Feb. 27, 2007    (FR) .................................... 07 01394

(51) Int. Cl.
*C10G 45/10*    (2006.01)
(52) U.S. Cl.
USPC ........... 585/240; 585/638; 585/639; 585/733; 44/605; 208/49; 208/57; 208/89

(58) Field of Classification Search
USPC ................ 208/49, 57, 89; 44/605; 585/240, 585/638–639, 733
See application file for complete search history.

(56) References Cited

U.S. PATENT DOCUMENTS
4,992,605 A     2/1991   Craig et al.
2008/0161614 A1*  7/2008   Bertoncini et al. ........... 585/240

FOREIGN PATENT DOCUMENTS
| EP | 0 350 763 A1 | 1/1990 |
| EP | 1 217 061 A1 | 6/2002 |
| EP | 1 396 531 A2 | 3/2004 |
| EP | 1 693 432 A1 | 8/2006 |

OTHER PUBLICATIONS

International Search Report for PCT/FR2008/000176, English.

* cited by examiner

Primary Examiner — Brian McCaig
(74) Attorney, Agent, or Firm — Sughrue Mion, PLLC

(57) ABSTRACT

The invention relates to a method for the catalytic hydrotreatment of a load based on a diesel fuel oil and a biological load based on plant oils and/or animal fats in a hydrotreatment unit. The invention is characterized in that the hydrotreatment unit comprises at least one hydrotreatment reactor operating on a countercurrent. The invention also relates to a hydrotreatment unit for implementing said method, and a corresponding hydrorefining unit.

27 Claims, 2 Drawing Sheets

Figure 1:
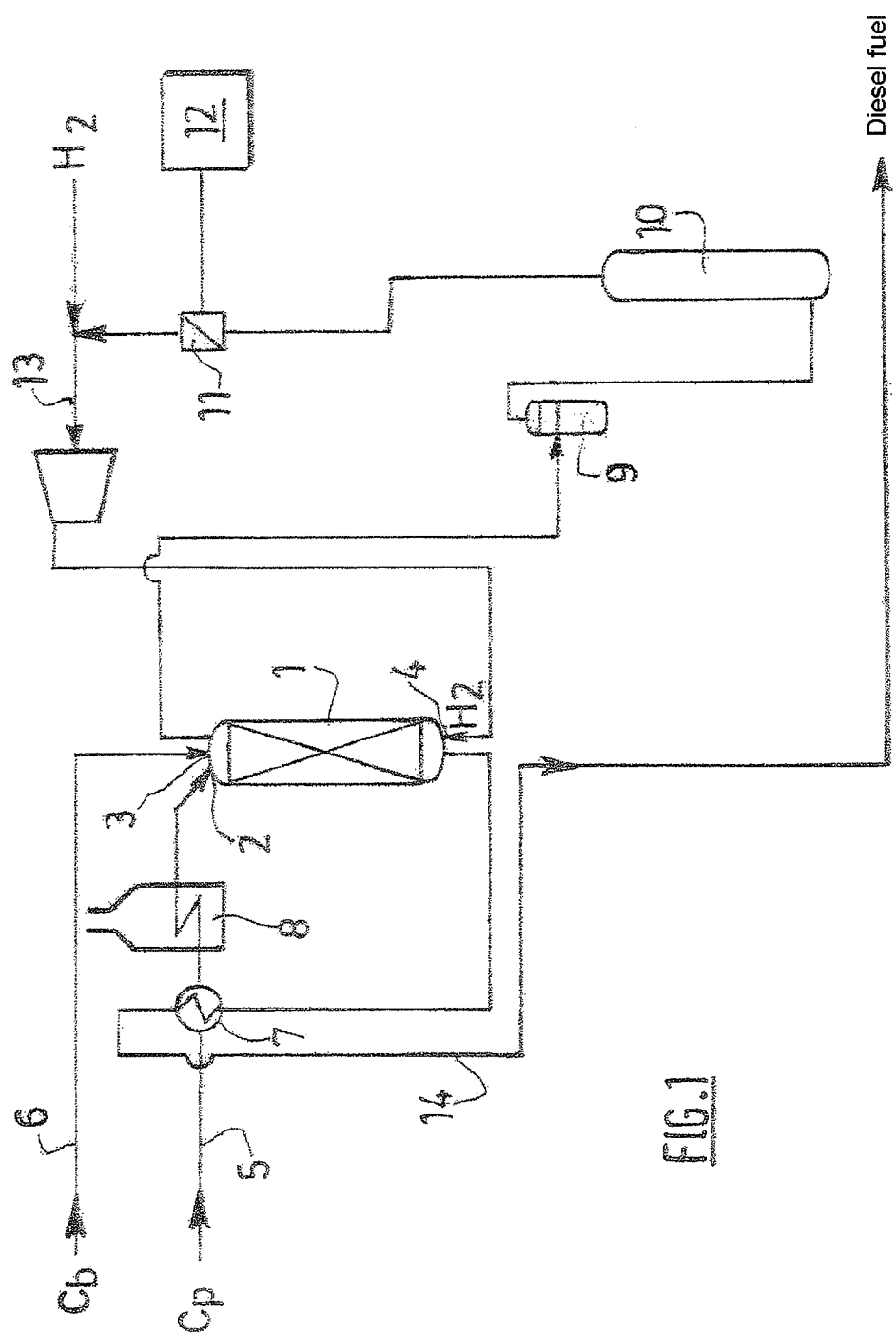

PROCESS FOR HYDROTREATING A DIESEL FUEL FEEDSTOCK, HYDROTREATING UNIT FOR IMPLEMENTING SAID PROCESS, AND CORRESPONDING HYDROREFINING UNIT

CROSS REFERENCE TO RELATED APPLICATIONS

This application is a U.S. National Stage of International Application No. PCT/FR2008/000176 filed Feb. 12, 2008, claiming priority based on French Patent Application No. 07 01394 filed Feb. 27, 2007, the contents of all of which are incorporated herein by reference in their entirety.

The invention relates to a process for hydrotreating a diesel fuel feedstock, to a hydrotreating unit for implementing said process, and also to a corresponding hydrorefining unit.

Due to the tightening of pollution control standards for diesel engines, the specifications for diesel engines have changed during the course of the last two decades and new constraints have appeared which have led to a modification of the formulations of diesel engine fuel mixtures.

Since January 2005, the specifications for diesel engine fuels have been the following (French standard EN590):
Density (at 15° C.): 820-845 kg/m$^3$;
T95% (Distillation temperature for 95% of diesel fuel): 360° C. (maximum);
Sulphur content: 50 mg/kg (maximum);
Engine cetane number: 51 (minimum);
Calculated cetane index (ASTM D4737): 46 (minimum); and
Cloud point: <−5° C. in winter,
<+5° C. in summer.

The desired base stocks are therefore light base stocks, having a low sulphur content, a high cetane index and that distil completely below 360° C.

The objectives are to further reduce the sulphur content to a value below 10 mg/kg by 2009 and to increase the minimum value of the engine cetane number.

One solution for improving the cetane index consists in adding a cetane improver. These are usually alkyl nitrates which intervene in the elementary oxidation steps before the self-ignition of the mixture. Thus they reduce the ignition delay and make it possible to increase the cetane index by 3 to 5 points depending on the amount added.

Another solution consists in adding a substitution fuel, such as a biofuel, to the mixture as the esters of vegetable oils generally have a good cetane index.

Therefore, the European Directive 2003/30/EC aims, in particular, to promote the use of biofuels. In the transport industry, the European Community has adopted an objective of substituting biofuels for 5.75% of the NCV (net calorific value) of fuels by 2010. That is to say that the amount of biofuel present in the mixture should provide 5.75% of the NCV of the mixture.

Currently, the French government has established a tax: the TGAP (Taxe Générale des Activités Polluantes [*General Tax on Polluting Activities*]), which relates to fuels consumed on French territory. The fuels subject to this tax are "SP95", "SP98" and "diesel engine fuel". The objective of this tax is to encourage the incorporation of biofuel by gradually increasing the percentage of the NCV (net calorific value) provided by the proportion of biofuel from 1.75% in 2006 to 7% in 2010.

This addition is carried out based on the energy and "Bio" origin of the products incorporated. Thus, ETBE (ethyl tert-butyl ether) sees its level reduced as it only contains 47% of ethanol (of agricultural origin) and an NCV lower than petrol.

For diesel engine fuels, the most commonly used biofuels are vegetable oil esters, such as rapeseed oil methyl ester (RME).

These diesel engine fuels are generally obtained by mixing the biofuel with the diesel engine fuel after treating the latter. These mixtures are thus often produced by the distributors, immediately before distributing the fuel.

The mixtures obtained from vegetable oil methyl esters have the advantage of a cetane number that conforms to the standard, but they have problems of low-temperature resistance and oxidation stability. Furthermore, these mixtures are too heavy and have a density much higher than the specification of the standard, which causes formulation difficulties at high incorporation levels.

Processes for refining biomass which have been designed to produce these biofuels are already known. Thus, the documents U.S. Pat. No. 4,992,605, U.S. Pat. No. 5,705,722, EP 1 396 531 and SE 520 633 describe processes for hydrotreating triglycerides contained in vegetable oils. The reactions carried out are however strongly exothermic. In order to limit the problems linked to this high exothermicity, it is necessary to recirculate up to 80% of the feedstock from the hydrotreating reactor outlet to its inlet, hence the need to produce a new plant dedicated to this hydrotreating process, and to hydraulically oversize this unit relative to the amount of feedstock actually treated.

Moreover, Patent Application EP 1 693 432 describes a process for hydrotreating a mixture of a feedstock of oil origin and a feedstock of biological origin. Nevertheless, since the reactions for hydrodeoxygenating the triglycerides are faster than those for hydrorefining oil cuts, the treatment of such a mixture of feedstocks of oil and biological origin at the top of the reactor results in a drop in the partial pressure of hydrogen and therefore a drop in the catalytic activity for hydrotreating the oil feedstock. Furthermore, side reactions during the hydrorefining of the triglycerides result in the production of gases such as carbon dioxide $CO_2$, methane $CH_4$ and carbon monoxide CO which is considered as a reversible inhibitor of the desulphurizing activity of the catalyst. However, in a conventional hydrotreating unit, these gases that contain hydrogen $H_2$ (recycling gas) are usually separated from the effluent exiting the reactor, then reinjected into the reactor after passing through a treatment system. The presence of CO in the recycling gas therefore proves damaging for the hydrorefining reactions of the oil cut.

The Applicant has proposed, in its French Patent Application 06.06892, a process for hydrotreating a mixture of a feedstock of oil origin, of diesel fuel type, and a feedstock of biological origin, of the vegetable oil and/or animal fats type, without a device for recycling the liquid effluent at the top of the reactor. This mixture is introduced at the top of the reactor, in the manner of a conventional feedstock. The process described in this application, in one of its variants, comprises a unit for separating and treating the carbon monoxide present in the recycling gas.

Nevertheless, there is still a need in the art to improve the performance of the process for hydrotreating a mixture of a feedstock of oil origin and a feedstock of biological origin, while limiting the formation of gases of $CH_4$ type, and also $H_2O$.

In particular, when triglycerides are added to a diesel fuel feedstock, it is necessary to increase the amount of hydrogen $H_2$ supplied in order to cater for the increase in $H_2$ consumption, and to increase the reaction temperature, or the catalyst volume, if it is desired to maintain the same hydrodesulphurization (HDS) activity, that is to say if it is desired to achieve the same level of sulphur at the outlet relative to a conventional HDS where only a feedstock of oil origin is treated.

However, a higher reaction temperature leads to a reduction in the cycle time, so that it is preferable to be able to decrease this temperature in order to increase this time. It is also preferable to limit the $H_2$ consumption for economic reasons.

For this purpose, the invention provides a process for the catalytic hydrotreating of a feedstock of oil origin, of diesel fuel type, and of a feedstock of biological origin based on vegetable oils and/or animal fats in a hydrotreating unit, characterized in that said hydrotreating unit comprises at least one fixed-bed hydrotreating reactor operating countercurrently.

For this purpose, another subject of the invention is a hydrotreating unit for implementing said process, and a corresponding hydrorefining unit.

Within the meaning of the present invention the expression "feedstock of biological origin" is understood to mean any renewable feedstock commonly defined by the term "biomass".

Due to the use of a configuration in which at least one hydrotreating reactor operates countercurrently, the treatment of the feedstock of oil origin is not disturbed by the treatment of the feedstock of biological origin.

This is because, as the hydrodeoxygenation (HDO) reactions of the triglycerides are faster than those for hydrorefining oil cuts, these HDO reactions are preferably carried out in the upper part of said reactor. The countercurrent arrangement therefore makes it possible to carry out these HDO reactions under conditions where the partial pressure of $H_2$ is lower, which limits the formation of gases such as methane $CH_4$ and favours the "water shift" reaction which produces $H_2$ and $CO_2$ from CO, with, as a result, a decrease in the $H_2$ consumption and the exothermicity of the reaction. This is because the cracking reactions which take place during the deoxygenation of the feedstock of biological origin (by decarbonylation and/or decarboxylation) result in the detachment of a carbon at the chain end, which will induce a thermodynamic equilibrium between $CO/CO_2/CH_4$ via "CO Shift" reactions ($CO+H_2O<->CO_2+H_2$) and methanation reactions of the CO($CO+3H_2<->CH_4+H_2O$) and of the $CO_2$ ($CO_2+4H_2<->CH_4+2H_2O$).

Furthermore, owing to the countercurrent arrangement, the gases formed due to the HDO reactions of the triglycerides are removed by the gas stream flowing countercurrently, thus avoiding the inhibition effect due to the CO and the effect of dilution of hydrogen by the gases formed. The hydrorefining reactions of the oil cut thus take place under favourable conditions where the partial pressure of hydrogen is higher. This also makes it possible to achieve very low sulphur contents, as the heaviest and most refractory sulphur-containing molecules, which are generally the most difficult and take the longest to desulphurize, are found at the bottom of the reactor at a higher partial pressure of hydrogen, and turn out to be more easily desulphurized therein. Furthermore, due to the countercurrent arrangement, $H_2S$ and other elements that are damaging to the reaction are not found in this part of the reactor, which facilitates the desulphurization of these refractory molecules even more.

The process according to the invention also minimizes the residence time, in the reactor, of the CO formed in the HDO reaction, which limits the methanation reactions of CO to produce $CH_4$. The hydrogen consumption is therefore reduced, and the overall exothermicity of the reaction is lower.

Moreover, since the configuration of at least one countercurrent reactor is more efficient from the point of view of the catalytic activity, it is then either possible to work having the same catalyst volume at lower temperatures, which minimizes the decarbonylation and decarboxylation reactions which give rise to the CO, $CO_2$ and $CH_4$ gases, or it is possible to work at the same temperature, with lower catalyst volumes, in order to obtain the same reaction performance.

Furthermore, generally, recombination reactions of olefins with $H_2S$, favoured at high temperature, are the cause of the formation of mercaptans and make it difficult to obtain diesel fuel having a very low sulphur content. However, treatment conditions at a lower reaction temperature and also the absence of $H_2S$ at the bottom of the countercurrent reactor are favourable to the minimization of these recombination reactions, which makes it possible to obtain a product having a very low sulphur content (<3 ppm).

Another advantage of the invention is that since hydrotreating feedstocks of biological origin based on vegetable and/or animal oils is highly exothermic, it requires a means for controlling the reaction temperature such as the use of a large dilution volume. For this reason, to date, these vegetable and/or animal oils were treated in dedicated units with a high degree of recycling of liquid effluent. It is thus possible to limit, or even eliminate, the recycling of liquid effluent by using the process according to the invention compared to the known processes for refining a feedstock of biological origin alone, as the feedstock of biological origin is either injected with the feedstock of oil origin, or downstream of the injection of the latter, so that it is always diluted.

The $CO/CO_2$ ratio is always driven by the equilibrium constant of the "CO shift" reaction ($CO+H_2O<->CO_2+H_2$). Thus, a decrease in the concentration of CO, of which the inhibitor effect is problematic, in favour of the concentration of $CO_2$, which may be more easily removed, for example by scrubbing with amines, is obtained by:

decreasing the partial pressure of $H_2$, obtained according to the invention by the fact that a large part of the hydrogen is consumed by hydrotreating the diesel fuel feedstock in the bottom part of the countercurrent reactor, whereas hydroxydeoxygenation of the feedstock of biological origin is preferably carried out in the upper part of said reactor;

treating the feedstock of biological origin at the lowest possible temperature, which may be obtained in one variant of the invention described later on;

the addition of water, which may be obtained in another variant of the invention described later on; and elimination of the carbon monoxide from the recycling gas of the unit, such as described later on.

In a first variant of the process according to the invention, the hydrotreating unit comprises a single reactor operating countercurrently into which the feedstocks of oil and biological origin are injected. Preferably, the two feedstocks are injected at the top of the reactor. It is also possible that the feedstock of oil origin be injected at the top of the reactor, whereas the feedstock of biological origin be, itself, injected downstream of the latter. It is also possible that the feedstock of biological origin be injected, partly, at the top of the reactor, like the feedstock of oil origin, and partly downstream of the latter.

It is then possible, in the process according to the invention, to use different catalysts in each of the catalyst regions where the feedstocks of oil and biological origin are injected: for example CoMo for the region for hydrorefining the oil cut and preferably NiMo for the second region treating the triglycerides.

This variant has the advantage of allowing the use of an existing hydrotreating unit to which an inlet will have been added for the feedstock of biological origin.

In a second variant, the hydrotreating unit comprises two separate reactors, a first reactor operating cocurrently and a second reactor operating countercurrently that receives the liquid effluent exiting the first reactor, the feedstock of oil origin being injected into the first cocurrent reactor and the feedstock of biological origin being injected into the first cocurrent reactor and/or into the second countercurrent reactor as a mixture with the liquid effluent exiting the first reactor.

Preferably, the feedstock of oil origin is injected at the top of the first, concurrent reactor and the feedstock of biological origin is injected at the top of the second, countercurrent reactor, as a mixture with the liquid effluent exiting the first reactor. It is also possible that the feedstock of biological origin be injected, partly, into the first, cocurrent reactor downstream of the feedstock of oil origin, and partly at the top of the second, countercurrent reactor as a mixture with the liquid effluent exiting the first reactor.

This variant has the advantage of allowing the treatment of the feedstock of biological origin at a lower temperature than the temperature for treating the feedstock of oil origin. Specifically, the hydrotreatment of the feedstock of biological origin may be carried out at a lower temperature, so that it is not necessary to heat the feedstock a lot in order to treat it. Furthermore, since a large part of the hydrotreatment of the feedstock of oil origin has already taken place in the first reactor, the second reactor then allows the hydrofinishing of the treatment of the feedstock of oil origin and does not require temperatures which are so high. This hydrofinishing makes it possible to obtain a much lower sulphur content compared to the contents normally obtained in hydrorefining.

Furthermore, these conditions of treatment at a lower reaction temperature in the second, countercurrent reactor, and also the absence of $H_2S$ in the lower part of the countercurrent reactor, are favourable to the minimization of the recombination reactions of olefins with $H_2S$ that are the cause of the formation of mercaptans, which makes it possible to obtain a product having a very low sulphur content.

This lower temperature in the second, countercurrent reactor also makes it possible to limit potential problems linked to the thermal stability of the feedstock of biological origin, in particular when the liquid effluent exiting the first reactor is cooled prior to being mixed with the feedstock of biological origin.

It is especially possible to recover the heat from this effluent, and to thus reduce the temperature of the latter, in order to heat the feedstock of oil origin, and if necessary the feedstock of biological origin, before they enter into their respective reactor.

The exothermicity of the reaction for hydrotreating the feedstock of biological origin requires, in addition, a large dilution volume which is provided by the partially hydrotreated feedstock of oil origin exiting the first reactor.

The reduction in the temperature of the second, countercurrent reactor also favours a decrease in CO production.

Furthermore, the countercurrent configuration makes it possible to obtain a more forced hydrogenation of the aromatic compounds due to a higher partial pressure of hydrogen at the bottom of the reactor and a lower operating temperature. This allows a substantial improvement in the cetane number of the final product, which is even greater when the oil feedstock introduced comprises cuts having a high content of aromatics, such as those originating from coking or FCC units.

Finally, carrying out the hydrodesulphurization reactions and hydrodeoxygenation reactions in two separate reactors enables independent control of the catalysts in each of the reactors, and makes it possible to produce biomass-free diesel fuels. For this, it is possible either to isolate the second reactor so as to only use the first reactor, or to stop the supply of vegetable oils and/or animal fats and use both reactors for hydrotreating the diesel fuel feedstock.

Advantageously, the feedstock of oil origin, of diesel fuel type, is chosen from diesel fuel cuts resulting from the distillation of a crude oil and/or of a synthetic crude derived from the treatment of oil shales or of heavy and extra-heavy crude oils or of the effluent from the Fischer-Tropsch process, the diesel fuel cuts resulting from various conversion processes, in particular those resulting from catalytic and/or thermal cracking (FCC, coking, visbreaking).

In particular, the feedstock of biological origin based on vegetable oils and/or animal fats is introduced up to a level of 30% by weight. More particularly, the level of feedstock of biological origin based on vegetable oils and/or animal fats is preferably less than or equal to 15% by weight. This is because the introduction of such a level of feedstock of biological origin only very slightly affects the low-temperature properties of the final product. In particular, the cloud point of the final effluent generally only has a difference of 1° C. compared to the effluent obtained without injection of biomass. This result, which differs from that which the laws of mixtures would have predicted, is very advantageous as it demonstrates the synergy, during the process according to the invention, between the two types of feedstocks.

The introduction of high levels of feedstock of biological origin is permitted due to the use of the hydrotreated feedstock of oil origin as a diluant, without it being necessary to recirculate the liquid effluent upstream of where the feedstock of biological origin is introduced.

The vegetable or animal oils contained in the feedstock of biological origin used according to the invention are mostly composed of fatty acid triglycerides (>90% by weight), whose chain lengths depend on the nature of the oil used. They may advantageously contain fatty acids. Within the meaning of the invention, the vegetable oils and animal fats may also contain fatty acid esters.

Within the context of the invention, the vegetable oils and animal fats may be used crude, but they are preferably refined in order to prevent fouling of the hydrotreating unit. In this case, they are referred to as degummed oils, that is to say oils that have had a large portion of the phospholipids removed.

The vegetable oils may, in particular, be palm oil, soya bean oil, rapeseed oil, sunflower oil, linseed oil, rice bran oil, maize oil, olive oil, castor oil, sesame oil, pine oil, peanut oil, palm kernel oil, coconut oil, babassu oil, oil derived from algae or a mixture of two or more of these oils. These oils will mainly produce $C_{12}$ to $C_{18}$ paraffins.

Palm oil is particularly preferred, as it is one of the oils having carbon-based chains closest to the average length of the carbon-based chains of a diesel engine fuel, with close to 50% of $C_{16}$. As palm oil is one of the most saturated, its hydrotreatment requires a lower amount of hydrogen compared to other oils. Furthermore, the thermal stability of the palm oil limits the fouling of the heat exchangers located upstream of the reactor in a conventional hydrorefining unit.

Palm oil furthermore has the advantage of having its profile centred on that of the diesel fuel feedstock, which limits the disruption to the latter, of being economical, and of being little used in the human diet.

As animal fats, it is possible, for example, to use fish fat or animal oil.

One particularly advantageous way of using the invention is therefore to preferably use palm oil or any other vegetable oil or oil of animal origin capable of producing, by hydrotreatment, a maximum of $C_{15}$ to $C_{18}$ linear paraffins so as to induce a large increase in the cetane index of the feedstocks produced while reducing the density, and to better enhance the value of base stocks having a low cetane index and a high density, such as LCO (Light Cycle Oil) which is characterized by a high density and a very low cetane index, and the diesel fuels resulting from sour crudes that have excellent low-temperature properties but have the characteristics of exhibiting a high density and a low cetane index. Furthermore, the process according to the invention makes it possible to promote the hydrogenation of aromatic compounds and to substantially improve the cetane number of the final product.

Advantageously, the catalyst region for injection of the feedstock of biological origin comprises a first metal-trapping catalyst layer. These metal-trapping catalysts are known in themselves, and are generally composed of macroporous alumina. The objective of using such a commercially known metal trap is to remove from the vegetable oils and/or animal fats any impurities that they may contain (Na, K, Cl, etc.).

According to one particular feature of the invention, use is made of an amount of hydrogen introduced into the countercurrent reactor from 50 to 2000 Normal liters of $H_2$ per liter of feedstock, preferably from 100 to 1500 Normal liters of $H_2$ per liter of feedstock, and more preferably still from 120 to 500 Normal liters of $H_2$ per liter of feedstock.

According to one particular feature of the invention, the feedstock treatment temperature in the countercurrent reactor is from 250 to 420° C., preferably from 280 to 400° C.

According to one particular feature of the invention, the various feedstocks are treated at a pressure of 25 to 150 bar, preferably from 30 to 70 bar.

According to another feature of the invention, the HSV of the feedstock in the countercurrent reactor is from 0.3 to 10, preferably from 0.6 to 5.

Under the conditions of the process (P, T), the formation of $CH_4$ and $H_2O$ is thus slowed down as the reactions are limited (see the CO shift and methanation reactions described above). This results in a lower consumption of $H_2$ and in the production of a recycling gas having a higher concentration of hydrogen.

According to one particular feature of the invention, the feedstock of biological origin is treated over at least one catalyst bed in the hydrotreating unit, the catalyst bed containing at least one catalyst based on metal oxides chosen from the oxides of group VI-B metals (Mo, W) and group VIII-B metals (Co, Ni, Ru, Rh) and/or of noble metals such as Pt and Pd, supported on a support chosen from alumina, silica, silica-alumina, zeolite, ferrierite, phosphated alumina, phosphated silica-alumina, mordenite or mazite.

For example, the catalyst used will be NiMo, CoMo, NiW, PtPd, or a mixture of two or more of the latter. The catalyst used may also be based on metals in the bulk state such as the catalyst commercially known under the name Nebula.

According to another particular feature of the invention, the feedstock of biological origin introduced into the hydrotreating unit is treated over at least one catalyst bed containing, at least in part, a catalyst with an isomerizing function, based on metal oxides or on oxides of noble metals such as Pt and Pd, on an acidic support such as amorphous silica-alumina, zeolite, ferrierite, phosphated alumina, phosphated silica-alumina.

Advantageously, in the last catalyst bed of the reactor operating countercurrently, a catalyst will be used with an isomerizing function that makes it possible to improve the low-temperature properties of the product. Specifically, catalyst beds containing metal oxides on an acid support have the advantage of promoting the isomerization reactions, which may make it possible to improve, that is to say substantially reduce, the cloud point of the finished product. This catalyst could be composed of metal oxides on an acid support such as amorphus silica-alumina, zeolite, ferrierite, phosphated alumina, phosphated silica-alumina.

Preferably, oxides of nickel and of tungsten will be used, and more preferably still oxides of noble metals, such as platinum, palladium, etc.

This is because the countercurrent configuration means that $H_2S$ and the other impurities such as CO and $CO_2$ are almost absent in the lower part of the reactor, and that the partial pressure of hydrogen is itself very high, which makes it possible to install therein a catalyst bed based on noble metal oxides, thus resulting in a better hydrodesulphurization and isomerization activity.

Advantageously, in the second variant of the invention, according to which the hydrotreating unit comprises two separate reactors, the first catalyst region intended for treating the feedstock of oil origin contains one or more catalyst beds containing catalysts which have good hydrodesulphurization performance, whereas the second catalyst region intended for treating the feedstock of biological origin contains one or more catalyst beds containing catalysts that have good performance for the deoxygenation of the triglycerides of the feedstock (for exampled based on NiMo) and/or catalysts that promote the isomerization reactions.

Preferably, in the last bed of the second catalyst region, a catalyst will be used with an isomerizing function that makes it possible to improve the low-temperature properties of the product.

Advantageously, water is injected into the hydrotreating unit in the region for treating the feedstock of biological origin. The presence of water in the reactor, and more precisely in the region for treating the feedstock of biological origin, specifically makes it possible to shift the equilibrium of the "CO shift" reaction towards conversion of CO to $CO_2$, which can be removed much more easily. Thus, the conversion of CO produced by the hydrodeoxygenation reaction to $CO_2$ and $H_2$ is promoted, while limiting the methanation reaction which produces methane $CH_4$, which results in a decrease in the exothermicity and in the $H_2$ consumption. Furthermore, in the process according to the invention, water, in the form of steam, is removed by the gas stream flowing countercurrently.

In one particularly advantageous variant of the process, comprising treatment of a recycling gas coming from the hydrotreating unit before its reinjection into said unit, an additional treatment of the carbon monoxide present in said recycling gas is carried out.

It is thus possible not to reinject carbon monoxide into the reactor so as not to risk inhibiting the catalyst.

In particular, such a treatment of CO may be carried out when the CO content of the recycling gases reaches a predetermined value.

The separation and treatment of the carbon monoxide may be carried out by introducing, into the system for treating the recycling gases, a device for separating and treating the carbon monoxide.

In particular, it is possible to use CO conversion systems (referred to as "CO shift" systems by experts) such as those generally supplied by hydrogen unit manufacturers. Thus, preferably, the carbon monoxide is treated by means of a CO conversion unit using the "CO shift" reaction. Thus CO is converted to $CO_2$, which can be removed more easily.

It is also possible to use a PSA (Pressure Swing Adsorption) treatment unit. This technology is known in itself. The adsorbants are chosen depending on the nature of the impurities to be removed from the hydrogen-carrying streams, and which are, in our case, carbon monoxide CO and optionally methane $CH_4$, ethane $C_2H_6$ and propane $C_3H_8$.

Preferably, the gases thus separated are used in a steam reformer, such as a steam methane reformer (SMR). The CO and the other products of the deoxygenation of the feedstock of biological origin are thus utilized as a syngas for producing a hydrogen-containing gas of biological origin. By using this configuration, the CO is therefore utilized and there is therefore no need, in order to prevent its inhibiting effect, to reduce its concentration in favour of the concentration of $CO_2$ which can be removed more easily.

Advantageously, in addition, a treatment is carried out during which the carbon dioxide ($CO_2$) and hydrogen sulphide ($H_2S$) present in said recycling gas are separated and treated before the latter is reinjected into the hydrotreating unit. This treatment is, for example, carried out by passing the recycling gas into an amine absorber. This additional treatment therefore makes it possible to remove the gases to be treated, that is to say the $CO_2$ and $H_2S$, from the circuit.

Another particularly advantageous way of using the invention, particularly when the level of vegetable oils and/or animal fats is high, is to compensate for the exothermicity which inevitably results from the addition of these oils.

Thus, advantageously, the exothermicity of the hydrotreatment of the feedstock is controlled by means of thermal control systems. In a conventional hydrotreating unit, these are, for example, the improvement in the liquid/gas distribution, gas and/or liquid quenches (that is to say the supply of cold gases or liquids to the reactor), distribution of the catalyst volume over several catalyst beds, control of the preheating of the feedstock at the reactor inlet, especially by action on the furnace and/or heat exchangers located upstream of the reactor, on by-pass lines, etc. in order to reduce the temperature at the reactor inlet.

According to a first variant of the invention, the addition of a liquid (liquid quench) will be preferred in order to control the exothermicity. This liquid may, for example, be composed of some of the hydrorefined feedstock exiting the hydrorefining unit. It is introduced into the region for treating the feedstock of biological origin, in particular when the hydrotreating unit comprises a single reactor. When the hydrotreating unit comprises two reactors, this liquid may be composed of some of the effluent from the first reactor. It is likewise introduced into the region for treating the feedstock of biological origin.

According to a second variant of the invention in which two separate reactors are used, a thermal control system consists in recovering the heat from the effluent exiting the first reactor in order to lower its temperature before it is injected into the second reactor. This makes it possible to achieve a significant energy saving.

The invention also relates to a hydrorefining unit comprising at least a catalytic hydrotreating unit for implementing said process. Advantageously, the hydrotreating unit comprises at least one fixed-bed hydrotreating reactor operating countercurrently. Moreover, the hydrorefining unit comprises a system for treating the recycling gases derived from the hydrotreating unit before they are reinjected into said unit, this treatment system comprising a device for separating and treating the carbon monoxide so as to remove the carbon monoxide present in said recycling gas.

In a first variant, the hydrotreating unit comprises a single reactor operating countercurrently. The feedstocks of oil and biological origin are then injected into this reactor.

In a second variant, the hydrotreating unit comprises two separate reactors, a first reactor reacting cocurrently and a second reactor operating countercurrently that receives the liquid effluent exiting the first reactor, the feedstock of oil origin being injected into the first, concurrent reactor.

The feedstock of biological origin is then injected into the first, cocurrent reactor and/or into the second, countercurrent reactor as a mixture with the liquid effluent exiting the first reactor.

Figure 2:
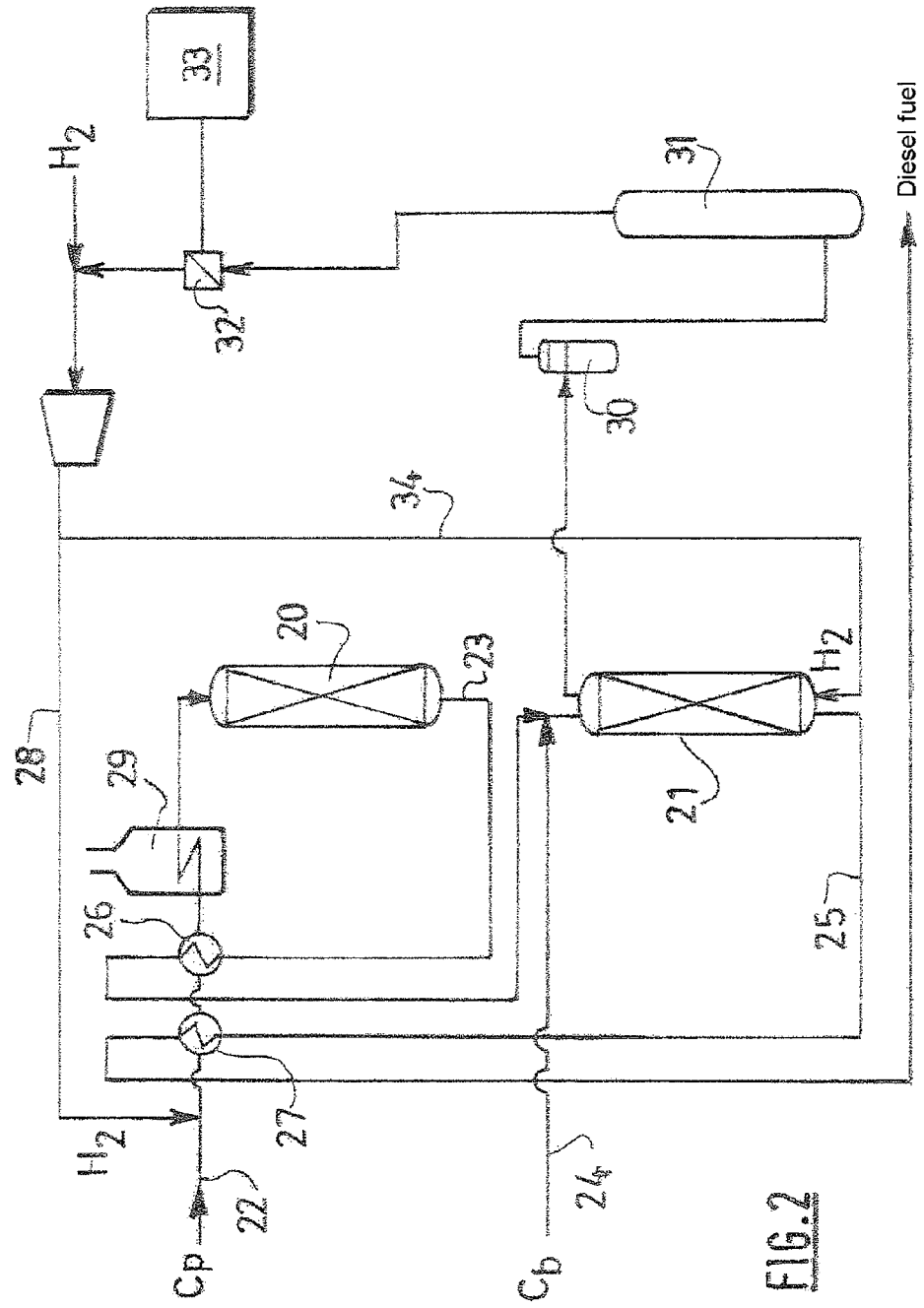

The invention is now described with reference to the appended non-limiting drawings, in which:

FIG. 1 is a simplified diagram of a hydrorefining unit comprising a hydrotreating unit according to a first embodiment of the invention, comprising a single countercurrent reactor; and FIG. 2 is a simplified diagram of a hydrorefining unit comprising a hydrotreating unit according to a second embodiment of the invention, comprising a first, cocurrent and a second, countercurrent reactor.

According to a first embodiment, a catalytic hydrotreating unit according to the invention is formed from a single reactor (1), as shown in FIG. 1. This reactor (1) operating countercurrently is equipped with a first inlet (2) for introducing a feedstock of oil origin ($C_p$) of diesel fuel type and a second inlet (3) for introducing a feedstock of biological origin ($C_b$) based on vegetable and/or animal oils. Preferably, these inlets are located at the top of the reactor.

Provision could however be made for the two feedstocks to be combined before their entry into the reactor and to enter via the usual inlet of the reactor.

Furthermore, the reactor (1) comprises an inlet (4) for introducing hydrogen $H_2$ countercurrently.

A line (5) carries the feedstock of oil origin ($C_p$) to the first inlet (2) of the reactor, whereas a line (6) carries the feedstock of biological origin ($C_b$) to the second inlet (3) of the reactor. The liquid effluent exiting the reactor (1) is discharged by means of a line (14).

A heat exchanger (7) is placed downstream from the reactor (1) in the line (14) in order to heat the feedstock $C_p$ flowing in the line (5), upstream of the reactor (1).

Downstream of the heat exchanger (7), and upstream of the reactor (1), the feedstock flowing in the line (5) is heated by a furnace (8).

The gas exiting the reactor (1) is conveyed towards a separator (9) which makes it possible to separate a gas that is rich in hydrogen and also contains CO and $CO_2$ from the effluent. This gas is introduced into a unit (10) for treating and separating the $CO_2$, for example an amine absorber, then into a unit (11) for separating and treating the CO, of the PSA type. The CO separated in this unit (11), and also the other gases separated such as $CH_4$, $C_2H_6$ and $C_3H_8$, may advantageously be conveyed towards an SMR unit (12) for producing hydrogen $H_2$. This hydrogen may then optionally be returned to the line (13) bringing the recycling gas into the countercurrent reactor (1).

According to a second embodiment, a catalytic hydrotreating unit according to the invention is formed from two reactors (20), (21). FIG. 2 represents a hydrorefining unit equipped with such a catalytic hydrotreating unit.

The first reactor (20) operates cocurrently, whereas the second reactor (21) operates countercurrently.

The feedstock of oil origin $C_p$ is conveyed to the top of this first reactor (20) by means of a line (22), but the liquid effluent exiting this first reactor, instead of being directed towards a separation stage, is conveyed to the top of the second reactor (21) by means of a line (23). A line (24) carrying the feedstock of biological origin $C_b$ joins up with the line (23) before it enters into the top of the second reactor (21). Separate inlets could however be envisaged in the second reactor.

A line (25) recovers the liquid effluent exiting the second reactor (21) and transports it to a separation stage.

In the same way as for a conventional unit, a heat exchanger (26) is placed downstream of the first reactor (20) in the line (23) in order to heat the feedstock $C_p$ flowing in the line (22), upstream of the first reactor (20).

Preferably, the hydrorefining unit according to the invention additionally comprises a second heat exchanger (27) placed downstream of the second reactor (21) in the line (25) which also heats the feedstock $C_p$ flowing in the line (22) upstream of the first reactor (20), this second exchanger (27) being, for example, placed upstream of the first exchanger (26).

Upstream of these heat exchangers (26) and (27), a line (28) connected to the line (22) conveys an $H_2$-rich gas to the feedstock $C_p$ to be treated in the first, concurrent reactor.

Downstream of the heat exchangers (26), (27) and upstream of the first reactor (21), the feedstock of oil origin mixed with the $H_2$-rich gas flowing in the line (22) is heated by a furnace (29).

At the exit of the second, countercurrent reactor (21), the liquid effluent is recovered and is cooled, then separated in a separation stage that is not represented here.

The gas exiting the second reactor (21) is conveyed towards a separator (30) which makes it possible to separate a gas that is rich in hydrogen and also contains CO and $CO_2$ from the effluent. This gas is introduced into a unit (31) for treating and separating the $CO_2$, for example an amine absorber, then into a unit (32) for separating and treating the CO, of the PSA type. The CO separated in this unit (32), and also the other gases separated such as $CH_4$, $C_2H_6$ and $C_3H_8$, may advantageously be conveyed towards an SMR unit (33) for producing hydrogen $H_2$. This hydrogen may then optionally be returned to the line (28) bringing the recycling gas into the first, cocurrent reactor (20) and into the line (34) bringing the recycling gas into the second, countercurrent reactor (21).

This unit first makes it possible to carry out the hydrorefining of oil cuts in the first reactor (20) and to carry out finishing of the hydrorefining of the oil cuts in the second reactor (21) and also the deoxygenation of the triglycerides of the feedstock of biological origin countercurrently.

It moreover clearly appears that the second reactor may be easily isolated from the circuit by means of valves, a by-pass line directly conveying the liquid effluent exiting the first reactor towards the separation and treatment devices. Thus, this hydrorefining unit may be used for hydrotreating a feedstock of oil origin with or without addition of a feedstock of biological origin.

The following examples illustrate the advantages produced by the process according to the invention.

EXAMPLES

Feedstock Studied

The feedstock based on diesel fuel that was studied was composed of 30% of LCO (Light Cycle Oil) and 70% of diesel fuel type cuts originating from the direct distillation (or straight-run (SR)) of a crude oil. The characteristics of this diesel fuel feedstock and also those of the palm oil incorporated at around 15% by weight are given in Tables 1 and 2 respectively.

TABLE 1 characteristics of the diesel fuel feedstock

| | |
|---|---|
| Density at 15° C. | 0.8738 |
| Sulphur content (ppm) | 6570 |
| Including refractory sulphur (dibenzothiophene or heavier compounds) (wt %) | 80% |
| Basic nitrogen content (ppm) | 23 |
| Cloud point (° C.) | −4 |
| Calculated cetane index (ASTM D 4737) | 47 |
| Distillation temperature of | |
| 5% | 240 |
| 20% | 259 |
| 50% | 285 |
| 80% | 319 |
| 95% | 344 |
| of the diesel fuel (° C., ASTM D 86) | |
| Content of polyaromatics (wt %) | 14.8 |
| Total content of aromatics (wt %) | 31.6 |

TABLE 2 characteristics of the palm oil

| | | |
|---|---|---|
| Density at 15° C. | | 0.8956 |
| Acid composition (weight percentages) | | |
| Lauric acid | 12:0 | 0.2 |
| Myristic acid | 14:0 | 1.1 |
| Palmitic acid | 16:0 | 45.7 |
| Palmitoleic acid | 16:1 | 0.2 |
| Margaric acid | 17:0 | 0.1 |
| | 17:1 | <0.1 |
| Stearic acid | 18:0 | 4.3 |
| Oleic acid | 18:1 | 37.7 |
| Linoleic acid | 18:2 | 9.8 |
| Linolenic acid | 18:3 | 0.2 |
| Arachidic acid | 20:0 | 0.4 |
| Gondoic acid | 20:1 | 0.1 |
| GPC: | | |
| Free fatty acids | | 0.7 |
| Monoglycerides | | <0.1 |
| Diglycerides | | 7.1 |
| Triglycerides | | 92.0 |
| Unidentified | | 0.2 |
| Content of elements (ppm) | | |
| Phosphorus | | 0.5 |
| Calcium | | <0.2 |
| Copper | | <0.08 |
| Iron | | 0.04 |
| Magnesium | | <0.02 |
| Sodium | | <0.1 |

Installation and Operating Conditions

In Example 1, which serves as a reference, the treatment was carried out on a unit comprising a hydrotreating reactor functioning cocurrently, in which the volume of catalyst was 54.6 m³. The simultaneous supply of palm oil and of the feedstock based on diesel fuel was carried out at the top of the reactor. The partial pressure of hydrogen was 63 bar and the average treatment temperature was 362° C. This treatment made it possible to ensure a sulphur content of 10 ppm starting from the feedstock treated here.

In Example 2, according to the invention, the treatment was carried out on a unit comprising a hydrotreating reactor operating countercurrently. The feedstock based on diesel fuel and the feedstock based on palm oil were incorporated at the top of the reactor. The overall catalyst volume in the unit was 54.6 m³ (identical to that of Example 1). The average reaction temperature was 350° C., which made it possible to ensure a sulphur content of 10 ppm starting from the feedstock treated here.

In Example 3, according to the invention, the treatment was also carried out on a unit comprising a hydrotreating reacting operating countercurrently. The feedstock based on diesel fuel and also the feedstock based on palm oil were incorporated at the top of the reactor. The overall catalyst volume is 33.3 m³. The average reaction temperature in the first reactor was 362° C. (identical to that of Example 1), which made it possible for the unit (assembly of two reactors in series) to ensure a sulphur content of 10 ppm starting from the feedstock treated here.

The reactors contained a commercial hydrodesulphurization catalyst known to a person skilled in the art, composed of porous alumina on which nickel and molybdenum oxides were deposited. This catalyst was in the form of trilobal extrudates having a diameter of 1 to 2 mm. The packing density was 950 kg/m³ of packed catalyst in the unit.

The partial pressure of hydrogen at the inlet of the reactor was 63 bar. The hydrogen blanket used for the examples given was 350 Nl/l (that is to say the amount of Normal liters of hydrogen per liter of feedstock).

A stage for stripping the liquid effluent was present at the outlet of the reactor in order to remove the gases such as $H_2S$, $NH_3$, CO or $CO_2$ when these compounds were present in the effluent.

Table 3 summarizes the operating conditions of the unit that were used.

TABLE 3

Operating conditions for obtaining a diesel fuel having 10 ppm of sulphur

|  | Example 1 | Example 2 | Example 3 |
|---|---|---|---|
| Flow rate of the diesel fuel feedstock (m³/h) | 47.7 | 47.7 | 47.7 |
| Flow rate of the palm oil feedstock (m³/h) | 6.9 | 6.9 | 6.9 |
| Catalyst volume (m³) | 54.6 | 54.6 | 33.3 |
| Average reaction temperature (° C.) | 362 | 350 | 362 |
| HSV (h⁻¹) | 1 | 1 | 1.63 |
| Hydrogen blanket (Sl/l) | 350 | 350 | 350 |
| Sulphur content of the effluent | 10 | 10 | 10 |

Comparison of Examples 1 and 2 shows that by using the same catalyst volume (54.6 m³), the implementation of the invention makes it possible to operate the first reactor at a temperature of 350° C. instead of 362° C. in the case of Example 1. This difference of 12° C. results in achieving a considerable energy saving. Furthermore, as the conditions are less severe, the cycle time is longer. In this case, it can be expected to have a cycle time that is at least one year longer.

The comparison of Examples 1 and 3 shows that at an average reaction temperature of the hydrotreating reactor of 362° C., the catalyst volume needed to obtain a diesel fuel having 10 ppm of sulphur at the outlet is lower when the invention is implemented. Specifically, the saving is 21.3 m³ of catalyst volume, which implies a drop of around 49% in the total catalyst volume for the unit.

Quality of the Products

Table 4 gives the results of a detailed analysis of the effluent obtained for Examples 1, 2 and 3. The incorporation of palm oil as a feedstock for a hydrodesulphurization unit comprising a reactor operating countercurrently has the result of adding normal paraffins to the final product, and the characteristics of the products obtained are found to be favourably affected. In particular, it is observed that the cloud point of the effluents is −2° C., whereas with the incorporation of 15% of palm oil to the diesel fuel feedstock it would have been expected to have a greater impact on the cloud point. Furthermore, it is also observed that the content of aromatic compounds of the effluents resulting from the implementation of the invention (Examples 2 and 3) in which the treatment is carried out on a unit comprising a hydrotreating reactor operating countercurrently, is substantially lower than that obtained in Example 1 in which the treatment is carried out on a unit comprising a hydrotreating reactor operating cocurrently. Furthermore, the cetane index is substantially improved by implementing the invention.

TABLE 4 characteristics of the effluents from Examples 2 and 3

|  | Example 1 | Example 2 | Example 3 |
|---|---|---|---|
| Density at 15° C. | 0.8436 | 0.8356 | 0.8336 |
| Sulphur (ppm) | 10 | 10 | 10 |
| Cloud point (° C.) | −3 | −2 | −2 |
| Calculated cetane index | 59 | 62 | 62.5 |
| GPC (triglycerides) (wt %) | <0.05 | <0.05 | <0.05 |
| Distillation temperature (° C., ASTM D86) | | | |
| 5% (% of product distilled) | 236 | 236 | 236 |
| 20% | 262 | 262 | 262 |
| 50% | 288 | 288 | 288 |
| 80% | 315 | 315 | 315 |
| 95% | 343 | 343 | 343 |
| Content of polyaromatics (wt %) | 4.2 | 2.2 | 2.1 |

The invention claimed is:

1. Process for the catalytic hydrotreating of a feedstock of oil origin, of diesel fuel type, and of a feedstock of biologicial origin based on vegetable oils and/or animal fats, comprising hydrotreating said feedstocks in a hydrotreating unit, characterized in that said hydrotreating unit comprises at least one fixed-bed hydrotreating reactor operating countercurrently with hydrogen.

2. Catalytic hydrotreating process according to claim 1, characterized in that the hydrotreating unit comprises a single reactor operating countercurrently into which the feedstocks of oil and biological origin are injected.

3. Catalytic hydrotreating process according to claim 1, characterized in that the hydrotreating unit comprises two separate reactors, a first reactor operating cocurrently and a second reactor operating countercurrently that receives the liquid effluent exiting the first reactor, and in that the feedstock of oil origin is injected into the first, cocurrent reactor, and the feedstock of biological origin is injected into the first, cocurrent and/or into the second, countercurrent reactor as a mixture with the liquid effluent exiting the first reactor.

4. Catalytic hydrotreating process according to claim 1, in which the feedstock of oil origin, of diesel fuel type, is chosen from diesel fuel cuts resulting from the distillation of a crude oil and/or of a synthetic crude derived from the treatment of oil shales or of heavy and extra-heavy crude oils or of the effluent from the Fischer-Tropsch process.

5. Catalytic hydrotreating process according to claim 1, in which the level of the feedstock of biological origin based on vegetable oils and/or animal fats is up to 30% by weight.

6. Catalytic hydrotreating process according to claim 5, in which the level of the feedstock of biological origin based on vegetable oils and/or animal fats is less than or equal to 15% by weight.

7. Catalytic hydrotreating process according to claim 1, in which the vegetable oils contained in the feedstock of biological origin are chosen from palm oil, soya bean oil, rapeseed oil, sunflower oil, linseed oil, rice bran oil, maize oil, olive oil, castor oil, sesame oil, pine oil, peanut oil, palm kernel oil, coconut oil, babassu oil, oil derived from algae, or a mixture of two or more of these oils.

8. Catalytic hydrotreating process according to claim 7, characterized in that the vegetable oils comprise palm oil.

9. Catalytic hydrotreating process according to claim 1, in which the feedstock of biological origin is injected into a catalytic region comprising a first metal-trapping catalyst layer.

10. Catalytic hydrotreating process according to claim 1, in which the amount of hydrogen introduced into the countercurrent reactor is from 50 to 2000 Normal liters of $H_2$ per liter of feedstock.

11. Catalytic hydrotreating process according to claim 1, in which the feedstock treatment temperature in the countercurrent reactor is from 250 to 420° C.

12. Catalytic hydrotreating process according to claim 1, in which the feedstock is treated at a pressure of 25 to 150 bar.

13. Catalytic hydrotreating process according to claim 1, in which the HSV of the feedstock in the countercurrent reactor is from 0.3 to 10.

14. Catalytic hydrotreating process according to claim 1, in which the feedstock of biological origin passes through at least one catalyst bed in the hydrotreating unit, the catalyst bed containing at least one catalyst based on metal oxides chosen from the oxides of group VI-B metals, and group VIII-B metals and/or noble metals, supported on a support chosen from alumina, silica, silica-alumina, zeolite, ferrierite, phosphated alumina, phosphated silica-alumina, mordenite or mazite.

15. Catalytic hydrotreating process according to claim 14, wherein the group VI-B metals are selected from Mo and W, the group VIII-B metals are selected from Co, Ni, Ru and Rh, and the noble metals are selected from Pt and Pd.

16. Catalytic hydrotreating process according to claim 1, in which the feedstock of biological origin introduced into the hydrotreating unit is treated over at least one catalyst bed containing, at least in part, a catalyst with an isomerizing function, based on metal oxides or on oxides of noble metals, on an acidic support selected from amorphous silica-alumina, zeolite, ferrierite, phosphated alumina and phosphated silica-alumina.

17. Catalytic hydrotreating process according to claim 16, wherein the noble metals are selected from Pt and Pd.

18. Catalytic hydrotreating process according to claim 1, in which water is injected into the hydrotreating unit in the region for treating the feedstock of biological origin.

19. Catalytic hydrotreating process according to claim 1, comprising treatment of a recycling gas coming from the hydrotreating unit before its reinjection into said unit, in which an additional treatment of the carbon monoxide present in said recycling gas is carried out.

20. Catalytic hydrotreating process according to claim 19, in which the carbon monoxide is treated by means of a CO conversion unit using the "CO shift" reaction.

21. Catalytic hydrotreating process according to claim 19, in which the carbon monoxide CO, and optionally methane $CH_4$, ethane $C_2H_6$, and propane $C_3H_8$, are separated by means of a PSA treatment unit.

22. Catalytic hydrotreating process according to claim 21, in which the separated carbon monoxide CO, and optionally the separated methane $CH_4$, ethane $C_2H_6$, and propane $C_3H_8$, are used in a steam reformer.

23. Catalytic hydrotreating process according to claim 1, comprising treatment of a recycling gas coming from the hydrotreating unit before its reinjection into said unit, in which, in addition, a treatment is carried out during which the carbon dioxide ($CO_2$) and hydrogen sulphide ($H_2S$) present in said recycling gas are separated and treated.

24. Catalytic hydrotreating process according to claim 1, in which the exothermicity of the hydrotreating of the feedstock of biological origin is controlled by means of thermal control systems.

25. Hydrorefining unit comprising at least one catalytic hydrotreating unit in fluid communication with a feedstock of oil origin, of diesel fuel type, and of a feedstock of biological origin configured to implement the process according to claim 1, said hydrotreating unit comprising at least one fixed-bed hydrotreating reactor operating countercurrently, the hydrorefining unit comprising a system configured to treat recycling gases derived from the hydrotreating unit before they are reinjected into said unit, this treatment system comprising a device for separating and treating carbon monoxide so as to remove the carbon monoxide present in said recycling gas.

26. Hydrorefining unit according to claim 25, characterized in that the hydrotreating unit comprises a single reactor operating countercurrently.

27. Hydrorefining unit according to claim 25, characterized in that the hydrotreating unit comprises two separate reactors, a first reactor reacting cocurrently and a second reactor operating countercurrently that receives the liquid effluent exiting the first reactor.

* * * * *